(12) United States Patent
Yuan

(10) Patent No.: US 7,583,363 B2
(45) Date of Patent: Sep. 1, 2009

(54) RANGE FINDER SYSTEM AND ELECTRONIC SYSTEM HAVING SAME

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/945,528

(22) Filed: Nov. 27, 2007

(65) Prior Publication Data

US 2008/0231720 A1  Sep. 25, 2008

(30) Foreign Application Priority Data

Mar. 21, 2007  (CN) .................... 2007 1 0200310

(51) Int. Cl.
  *G01C 3/08* (2006.01)
(52) U.S. Cl. .................... 356/3.01; 356/3.14; 356/4.01
(58) Field of Classification Search .............. 356/3.13, 356/3.14, 4.01–4.06; 348/139
  See application file for complete search history.

(56) References Cited

U.S. PATENT DOCUMENTS

| | | | | |
|---|---|---|---|---|
| 4,611,910 A | * | 9/1986 | Suzuki et al. .............. | 356/3.14 |
| 6,046,795 A | * | 4/2000 | Sugiyama et al. .......... | 356/3.14 |
| 6,614,509 B2 | * | 9/2003 | Nonaka et al. ............. | 356/3.14 |
| 6,690,451 B1 | * | 2/2004 | Schubert .................... | 356/3.14 |
| 7,042,491 B2 | * | 5/2006 | Saito et al. .................. | 348/139 |
| 2002/0105631 A1 | | 8/2002 | Nonaka et al. | |

FOREIGN PATENT DOCUMENTS

JP    2002-213946 A    7/2002

* cited by examiner

*Primary Examiner*—Isam Alsomiri
(74) *Attorney, Agent, or Firm*—Frank R. Niranjan

(57) ABSTRACT

A range finder system (100) includes a point light source (10), image pickup devices (20), (30), and a processing device (50). The point light source (10) emits light. The image pickup devices (20), (30) include lenses (22), (32) and sensors (24), (34), respectively. The lenses have focal lengths $F_1$, $F_2$ and the sensors (24), (34) have light-received units. The processing device (50) is electrically coupled to the image pickup devices (20), (30). The processing device (50) calculates distance $D_1$, $D_2$ from locations of images of the point light source (10) on the light-received units to centers of the sensors (24), (34), respectively. A distance X from the point light source (10) to the first lens (22) and the second lens (32) is determined based on the ratio of $D_1$ to $F_1$ and the ratio of $D_2$ to $F_2$.

6 Claims, 3 Drawing Sheets

RANGE FINDER SYSTEM AND ELECTRONIC SYSTEM HAVING SAME

BACKGROUND

1. Technical Field

The invention relates to electronic systems and range finder systems, and particularly to an electronic system and a range finder system using light to measure the distance between two target objects.

2. Description of Related Art

Range finding refers to a technique for determining the range, or distance, to a target. Currently, range finders are widely used in many fields, such as in engineering. The range finders are developed to improve the labor-consuming property existing in a conventional method for measuring a distance with a ruler or a conventional distance measurement device with a calibration rod.

A laser range finder using a laser beam to determine a distance to a target object is employed extensively in distance measurements. The laser range finder is operated based on the principle of sending a laser pulse toward the target object, and then receiving a laser signal reflected off the target object, whereby a traveling time of the laser signal is measured and the distance to the target object is obtained accordingly.

The electronic devices, such as a TV or a game console, and a remote control should have a particular distance therebetween so as to allow them operate effectively. That is, the user holding the remote control is limited to be in an effective range to control the electronic devices. Therefore, it is need to incorporate a capacity for measuring a distance into the remote control or the electronic devices to facilitate the usage thereof. However, the laser range finder mentioned above is costly and not suitable to be employed in the electronic devices or the remote control due to their complicated structure.

What is needed, therefore, is an electronic system and a range finder system having simple structures.

SUMMARY

A range finder system is provided. In one embodiment, the range finder system includes a point light source, a first image pickup device, a second image pickup device and a processing device. The point light source is configured to emit light. The first image pickup device includes a first lens and a first sensor disposed corresponding to the first lens. The first lens has a first focal length $F_1$. The first sensor has a first light-received unit. The second image pickup device is spaced apart from the first image pickup device a predetermined distance L. The second image pickup device includes a second lens and a second sensor disposed corresponding to the second lens. The second lens has a second focal length $F_2$. The second sensor has a second light-received unit. The processing device is electronically coupled to the first image pickup device and the second image pickup device. The processing device is configured to calculate a first distance $D_1$ from a location of an image of the point light source on the first light-received unit to a center of the first sensor, and a second distance $D_2$ from a location of the image of the point light source on the second light-received unit to a center of the second sensor. The processing device calculates a perpendicular distance from the point light source to a line connecting the first lens and the second lens based on the ratio of $D_1$ to $F_1$ and the ratio of $D_2$ to $F_2$.

Another range finder system for calculating a distance X is provided. In one embodiment, the range finder system includes a point light source, a first image pickup device, a second image pickup device and a processing device. The point light source is configured to emit light. The first image pickup device includes a first lens and a first sensor disposed corresponding to the first lens. The first lens has a first focal length $F_1$. The first sensor has a first light-received unit for receiving the emitted light. The second image pickup device is spaced apart from the first image pickup device a predetermined distance L. The second image pickup device includes a second lens and a second sensor disposed corresponding to the second lens. The second lens has a second focal length $F_2$. The second sensor has a second light-received unit for receiving the emitted light. The processing device is electronically coupled to the first image pickup device and the second image pickup device. The processing device is configured to calculate a first distance $D_1$ from a location of an image of the point light source on the first light-received unit to a center of the first sensor, and a second distance $D_2$ from a location of the image of the point light source on the second light-received unit to a center of the second sensor. The processing device calculates the distance X defined by the following equation:

$$X = \frac{L \times \tan\theta_1 \times \tan\theta_2}{\tan\theta_1 + \tan\theta_2}$$

where $\theta_1$ is a complementary angle for an angle of $\theta_3$ determined based on the ratio of $D_1$ to $F_1$, and $\theta_2$ is a complementary angle for an angle of $\theta_4$ determined based on the ratio of $D_2$ to $F_2$.

An electronic system is provided. In one embodiment, the electronic system includes a first electronic device and a second electronic device. The first electronic device includes a point light source for emitting light. The second electronic device includes a first image pickup device, a second image pickup device and a processing device. The first image pickup device includes a first lens and a first sensor disposed corresponding to the first lens. The first lens has a first focal length $F_1$. The first sensor has a first light-received unit. The second image pickup device is spaced apart from the first image pickup device a predetermined distance L. The second image pickup device includes a second lens and a second sensor disposed corresponding to the second lens. The second lens has a second focal length $F_2$. The second sensor has a second light-received unit. The processing device is electronically coupled to the first image pickup device and the second image pickup device. The processing device is configured for calculating a first distance $D_1$ from a location of an image of the point light source on the first light-received unit to a center of the first sensor, and a second distance $D_2$ from a location of the image of the point light source on the second light-received units to a center of the second sensor. The processing device calculates a perpendicular distance between the first electronic device and the second electronic device based on the ratio of $D_1$ to $F_1$ and the ratio of $D_2$ to $F_2$.

Advantages and novel features of the present range finder system, electronic system and method for measuring distance will become more apparent from the following detailed description of preferred embodiments when taken in conjunction with the accompanying drawings.

BRIEF DESCRIPTION OF THE DRAWINGS

The components in the drawing are not necessarily drawn to scale, the emphasis instead being placed upon clearly illustrating the principles of the present invention.

Figure 1:
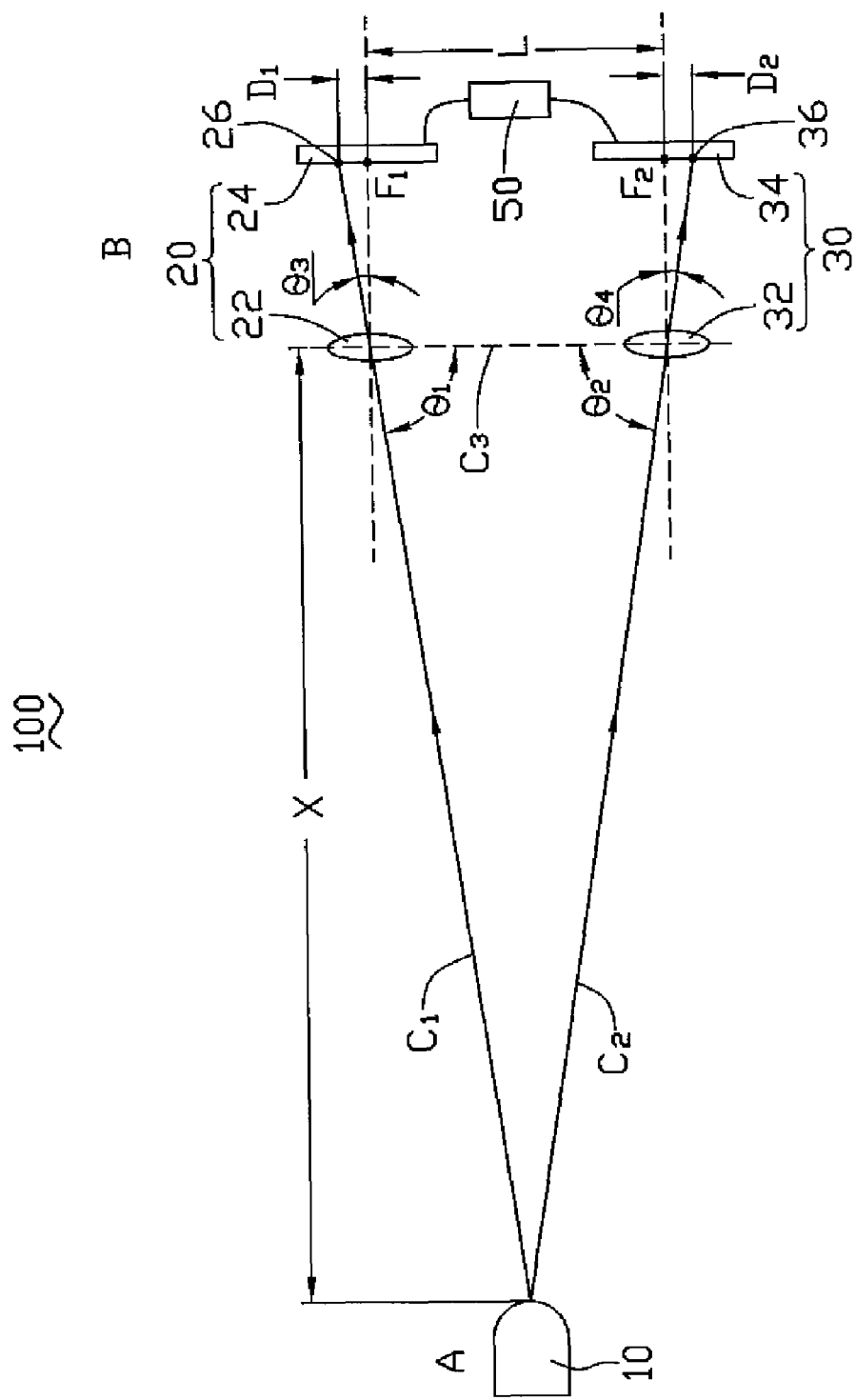
FIG. 1 is a schematic view of a range finder system in accordance with a preferred embodiment of the present invention.

Corresponding reference characters indicate corresponding parts throughout the drawings. The exemplifications set out herein illustrate at least one preferred embodiment of the present range finder system, electronic system and method for measuring distance, in one form, and such exemplifications are not to be construed as limiting the scope of the invention in any manner.

DETAILED DESCRIPTION OF THE EMBODIMENTS

Reference will now be made to the drawings to describe embodiments of the present range finder system and the electronic system in detail.

Referring to FIG. 1, a range finder system 100 in accordance with a present embodiment, is shown. The range finder system 100 includes a point light source 10, a first image pickup device 20, a second image pickup device 30, and a processing device 50.

The point light source 10 is configured to emit light toward the first image pickup device 20 and the second image pickup device 30. For example, the light beams $C_1$ and $C_2$ are received by the first image pickup device 20 and the second image pickup device 30, respectively. In the present embodiment, the point light source 10 can be a light emitting device for emitting visible light or invisible light, such as a halogen lamp, a fluorescent lamp or a light emitting diode (LED). In addition, the opposite position between the point light source 10 and the image pickup device 30, 50 is capable to vary and not limited to exemplification illustrated in FIG. 1.

The first image pickup device 20 and the second image pickup device 30 are disposed appropriately adjacent to each other so as to be able to receive the light emitting from the point light source 10. In particular, the first image pickup device 20 is spaced apart from the second image pickup device 30 a predetermined distance L. The first image pickup device 20 includes a first lens 22 and a first sensor 24 while the second image pickup device 30 includes a second lens 32 and a second sensor 34. In the present embodiment, the first lens 22 and the second lens 32 are converging lenses. In addition, the first lens 22 has a first focal length $F_1$ and the second lens 32 has a second focal length $F_2$. The first sensor 24 and the second sensor 34 have a first light-receiving unit 26 and a second light-receiving unit 36, respectively, to receive light emitting from the point light source 10. Referring to FIG. 1, the light beams $C_1$ and $C_2$ pass through a center of the first lens 22 and a center of the second lens 32, and then fall on the first sensor 24 and the second sensor 34, respectively. In this embodiment, each of the first sensor 24 and the second sensor 34 can be a charge-coupled device (CCD) or a complementary metal-oxide semiconductor (CMOS).

The processing device 50 is electronically coupled to the first image pickup device 20 and the second image pickup device 30. Particularly, the processing device 50 connects to the first sensor 24 and the second sensor 34. In the present embodiment, the processing device 50, for example, can include at least one signal processing circuit and at least one electronic element. Alternatively, the signal processing circuit and the electronic element can be integrated into a chip to act as the processing device 50.

In the present embodiment, when the point light source 10 is far away from the first image pickup device 20 and the second image pickup device 30, it is assumed that the light beams emitted from the point light source 10 are parallel. The parallel light beams pass through the converging lenses 22, 32, and are converged to a point where an image is formed. Referring to FIG. 1, the first light-receiving unit 26 of the first sensor 24 is the place where the light beam $C_1$ falls and an image of the point light source 10 formed. The second light-receiving unit 36 of the second sensor 34 is the place where the light beam $C_2$ falls and an image of the point light source 10 formed. A first distance $D_1$ from a location of the image on the first light-receiving unit 26 to a center of the first sensor 24 is calculated by the processing device 50 and then the value of $D_1$ is outputted. A second distance $D_2$ from a location of the image on the second light-receiving unit 36 to a center of the second sensor 34 is also calculated by the processing device 50 and then the value of $D_2$ is outputted.

As mentioned above, the values of $D_1$ and $D_2$ are referred to obtain a distance between the point light source 10 and the image pickup devices 20, 30. If the sensors 24, 34 are very close to the lens 22, 32, a perpendicular distance X from the point light source 10 to a line $C_3$ connecting the first lens 22 and the second lens 32 can be substantially equal to the distance between the point light source 10 and the image pickup devices 20, 30. In the present embodiment, the first sensor 24 and the second sensor 34 are placed around the focal lengths $F_1$ and $F_2$ of the first lens 22 and the second lens 32, respectively.

In the present embodiment, the perpendicular distance X is determined based on the trigonometric functions. Specifically, the values of $D_1$ and $F_1$ represent the lengths of two sides of a right triangle containing an angle $\theta_3$ while the values of $D_2$ and $F_2$ represent the lengths of two sides of a right triangle containing an angle $\theta_4$. That is, the value of $D_1$ is the length of side opposite to the angle $\theta_3$. The value of $D_2$ is the length of side opposite to the angles $\theta_4$. The value of $F_1$ is the length of side in contact with the angle $\theta_3$ and the right angle. The value of $F_2$ is the length of side in contact with the angle $\theta_4$ and the right angle. Accordingly, the value of the angle $\theta_3$ can be obtained by a function of the tangent of the angle $\theta_3$, i.e. the ratio of $D_1$ to $F_1$, and the value of the angle $\theta_4$ can be obtained by a function of the tangent of the angle $\theta_4$, i.e. the ratio of $D_2$ to $F_2$. In addition, a first included angle $\theta_1$ between the light beam $C_1$ incident into the first lens 22 and the line $C_3$, which is the complementary angle for the angle of $\theta_3$, can be obtained accordingly. A second included angle $\theta_2$ between the light beam $C_2$ incident into the second lens 32 and the line $C_3$, which is the complementary angle for the angle of $\theta_4$, also can be obtained. Finally, the perpendicular distance X can be obtained using the following equation:

$$X = \frac{L \times \tan\theta_1 \times \tan\theta_2}{\tan\theta_1 + \tan\theta_2}$$

Additionally, a method for measuring a distance X between a first place A and a second place B, according to a present embodiment, is shown. In this case, the first place A corresponds to a point light source 10 while the second place B corresponds to a first image pickup device 20 and a second image pickup device 30. A processing device 50 is electrically coupled to the first image pickup device 20 and the second image pickup device 30. The second image pickup device 30 is spaced apart from the first pickup device 20 a predetermined distance L. The first image pickup device 20 has a first lens 22 and a first sensor 24 disposed corresponding to the first lens 20. The first lens 22 has a first focal length F1. The first sensor 24 has a first light-receiving unit. The second image pickup device 30 has a second lens 32 and a second sensor 34 disposed corresponding to the second lens 32. The second lens 32 has a second focal length F2. The second sensor 34 has a second light-receiving unit. The method includes the following steps:

(a): emitting light from the point light source 10 toward the first image pickup device 20 and the second image pickup device 30;

(b): receiving the light by the first sensor 24 of the first image pickup device 20 and the second sensor 34 of the second image pickup device 30;

(c): obtaining a first distance $D_1$ from a location of an image of the point light source 10 on the first light-receiving unit 26 to a center of the first sensor 24, and a second distance $D_2$ from a location of the image of the point light source 10 on the second light-receiving unit 36 to a center of the second sensor 34; and (d): obtaining a perpendicular distance X between the first place A and the second place B based on the ratio of $D_1$ to $F_1$ and the ratio of $D_2$ to $F_2$.

Each step of the present method is described in greater detail below. In the present embodiment, because compositions, functions and characteristics of the point light source 10, the first image pickup device 20 and the second image pickup device 30 are similar to the same elements mentioned above, the detailed description is omitted for sake of conciseness.

In step (a), the point light source 10 at the first place A emits the light toward the first image pickup device 20 and the second image pickup device 30 at the second place B. Referring to FIG. 1, the light beams $C_1$ and $C_2$ from the point light source 10 pass through centers of the first lens 22 and the second lens 32 to fall on the first sensor 24 and the second sensor 34, respectively.

In step (b), the first sensor 24 of the first image pickup device 20 and the second sensor 34 of the second image pickup device 30 receive the light beams $C_1$ and $C_2$, respectively. In particular, the light beam $C_1$ passes through the center of the first lens 22 and is then received by the first light-receiving unit 26 of the first sensor 24 while the light beam $C_2$ passes through the center of the second lens 32 and is then received by the second light-receiving unit 36 of the second sensor 34.

In step (c), the first distance $D_1$ and the second distance $D_2$ are calculated by the processing device 50. In the present embodiment, the values of $D_1$ and $D_2$ are configured for facilitating calculation of the perpendicular distance X between the first place A and the second place B.

In step (d), the perpendicular distance X between the first place A and the second place B is calculated by the processing device 50. In the present embodiment, the step (d) includes the steps described as follows.

(d1): calculating the ratio of $D_1$ to $F_1$ so as to obtain a first included angle $\theta_1$ between the light beam $C_1$ incident into the first lens 22 and a line $C_3$ connecting the first lens 22 and the second lens 32;

(d2): calculating the ratio of $D_2$ to $F_2$ so as to obtain a second included angle $\theta_2$ between the light beam $C_2$ incident into the second lens 32 and a line $C_3$ connecting the first lens 22 and the second lens 32; and (d3): calculating a relationship between the values of $\theta_1$, $\theta_2$, and L to obtain the perpendicular distance X from the point light source 10 to the line $C_3$.

As mentioned above, in step (d1), the value of the angle $\theta_3$ can be obtained by deriving from the tangent function of the angle $\theta_3$, i.e. the ratio of $D_1$ to $F_1$. Moreover, in step (d2), the value of the angle $\theta_4$ can be obtained by deriving from the tangent function of the angle $\theta_4$, i.e. the ratio of $D_2$ to $F_2$. Thus, the complementary angles for the angle $\theta_3$ and $\theta_4$, i.e. the angle $\theta_1$ and $\theta_2$, can be obtained. Accordingly, the perpendicular distance X can be obtained by calculating the relationship of the values of $\theta_1$, $\theta_2$, and L. In particular, the perpendicular distance X can be obtained by the following equation:

$$X = \frac{L \times \tan\theta_1 \times \tan\theta_2}{\tan\theta_1 + \tan\theta_2}$$

Figure 2:
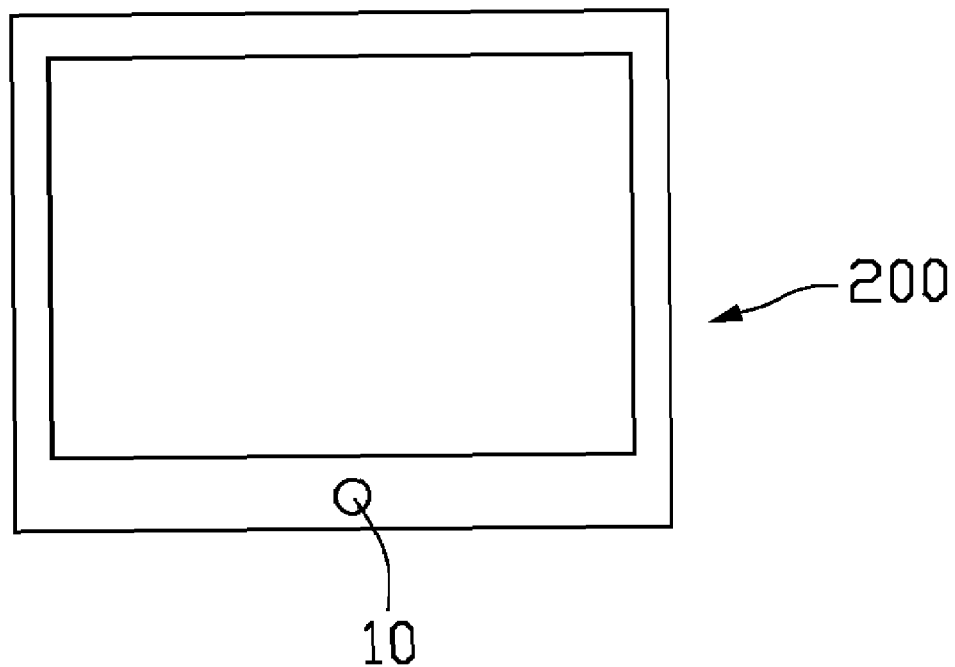
FIG. 2 is a schematic view of an electronic system in accordance with a preferred embodiment of the present invention.
Figure 2:
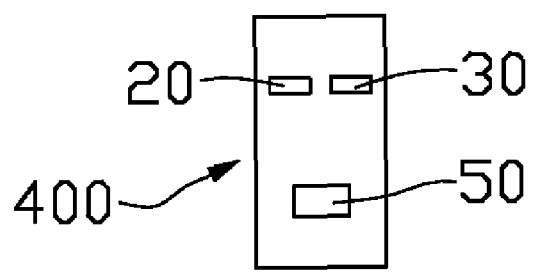
Figure 3:
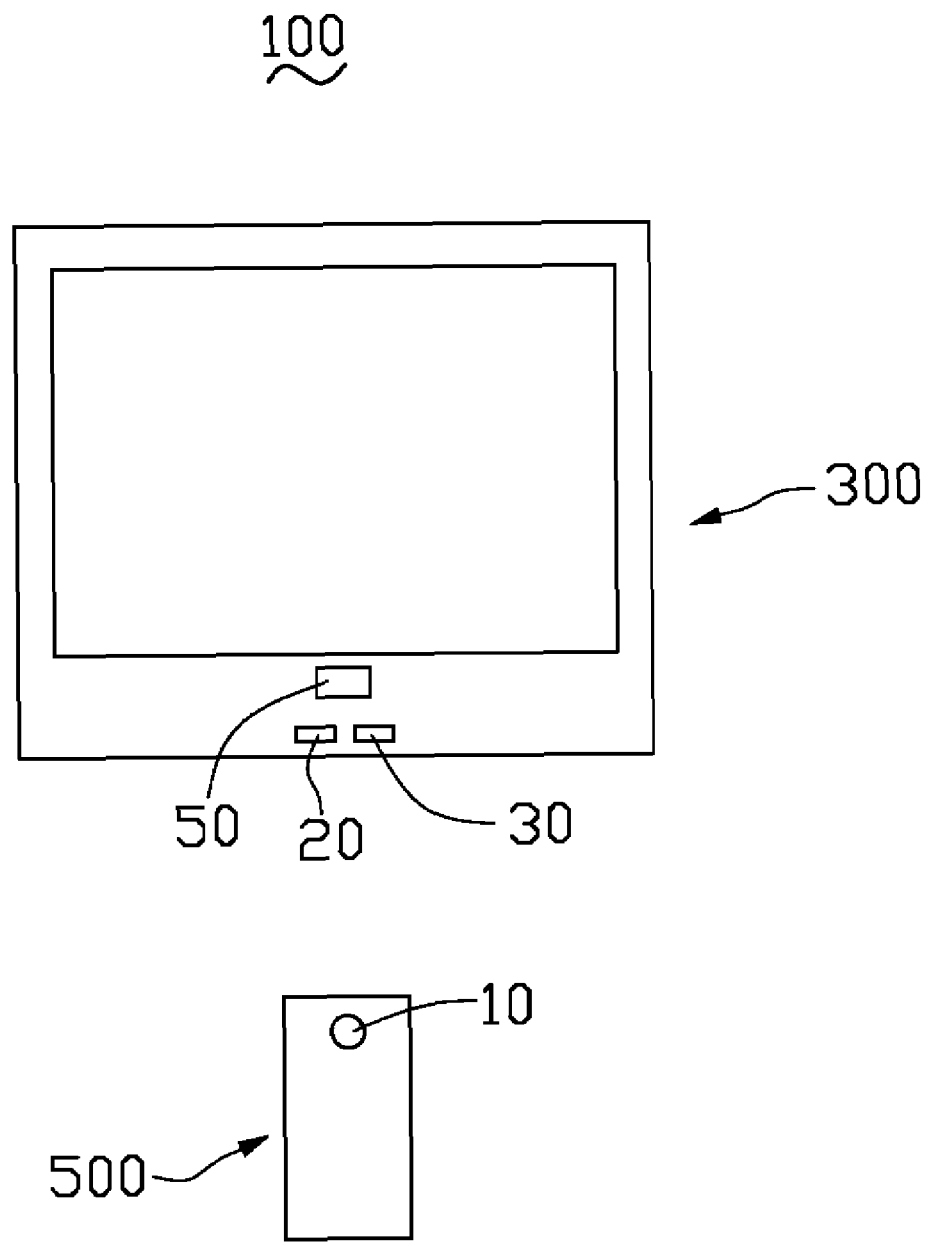
FIG. 3 is a schematic view of another electronic system in accordance with a preferred embodiment of the present invention.

Additionally, referring to FIG. 2 and FIG. 3, an electronic system 100 in accordance with present embodiments is shown. In FIG. 2, the electronic system 100 includes a first electronic device 200 and a second electronic device 400. The first electronic device 200 includes a point light source 10. The second electronic device 400 includes a first image pickup device 20, a second image pickup device 30 and a processing device 50.

However, because compositions, functions and characteristics of the point light source 10, the first image pickup device 20, the second image pickup device 30, and the processing device 50 are similar to the same elements mentioned above, the detailed description is omitted for sake of conciseness. Moreover, the perpendicular distance between the first electronic device 200 and the second electronic device 400 is obtained based on the trigonometric functions and the principle described above.

In the embodiment as shown in FIG. 2, the first electronic device 200 is a display device, such as an LCD, while the second electronic device 400 is a remote control. Alternatively, as shown in FIG. 3, a first electronic device 500 is a remote control, while a second electronic device 300 is a display device.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A range finder system for calculating a distance X, comprising:

a point light source configured to emit light;

a first image pickup device comprising a first lens and a first sensor disposed corresponding to the first lens, the first lens having a first focal length $F_1$, the first sensor having a first light-receiving unit for receiving the emitted light;

a second image pickup device spaced apart from the first image pickup device a predetermined distance L, the second image pickup device comprising a second lens and a second sensor disposed corresponding to the second lens, the second lens having a second focal length $F_2$, the second sensor having a second light-receiving unit for receiving the emitted light; and a processing device electronically coupled to the first image pickup device and the second image pickup device, the processing device configured for calculating a first distance $D_1$ from a location of an image of the point light source on the first light-receiving unit to a center of the first sensor and a second distance $D_2$ from a location of the image of the point light source on the second light-receiving unit to a center of the second sensor, and calculating the distance X according to the following equation:

$$X = \frac{L \times \tan\theta_1 \times \tan\theta_2}{\tan\theta_1 + \tan\theta_2}$$

where $\theta_1$ is a complementary angle for an angle of $\theta_3$, the tangent of which is the ratio of $D_1$ to $F_1$, and $\theta_2$ is a complementary angle for an angle of $\theta_4$, the tangent of which is the ratio of $D_2$ to $F_2$.

2. An electronic system, comprising:
   a first electronic device comprising a point light source for emitting light; and
   a second electronic device comprising a first image pickup device, a second image pickup device and a processing device, the first image pickup device comprising a first lens and a first sensor disposed corresponding to the first lens, the first lens having a first focal length $F_1$, the first sensor having a first light-receiving unit, the second image pickup device being spaced apart from the first image pickup device a predetermined distance L, the second image pickup device comprising a second lens and a second sensor disposed corresponding to the second lens, the second lens having a second focal length $F_2$, the second sensor having a second light-receiving unit, the processing device being electronically coupled to the first image pickup device and the second image pickup device, the processing device configured for calculating a first distance $D_1$ from a location of an image of the point light source on the first light-receiving unit to a center of the first sensor and a second distance $D_2$ from a location of the image of the point light source on the second light-receiving unit to a center of the second sensor, and calculating a perpendicular distance X between the first electronic device and the second electronic device according to the following equation:

$$X = \frac{L \times \tan\theta_1 \times \tan\theta_2}{\tan\theta_1 + \tan\theta_2}$$

where $\theta_1$ is a complementary angle for an angle of $\theta_3$, the tangent of which is the ratio of $D_1$ to $F_1$, and $\theta_2$ is a complementary angle for an angle of $\theta_4$, the tangent of which is the ratio of $D_2$ to $F_2$.

3. The electronic system as claimed in claim 2, wherein the point light source is a halogen lamp, a fluorescent lamp or a light emitting diode.

4. The electronic system as claimed in claim 2, wherein the first image pickup device or the second image pickup device is a charge-coupled device or a complementary metal-oxide-semiconductor.

5. The electronic system as claimed in claim 2, wherein the first electronic device is a display device and the second electronic device is a remote control.

6. The electronic system as claimed in claim 2, wherein the first electronic device is a remote control and the second electronic device is a display device.

* * * * *